Sept. 29, 1970     H. B. HUMMER     3,531,131
FLUID SEAL FOR ROTATING SHAFTS
Filed May 6, 1968
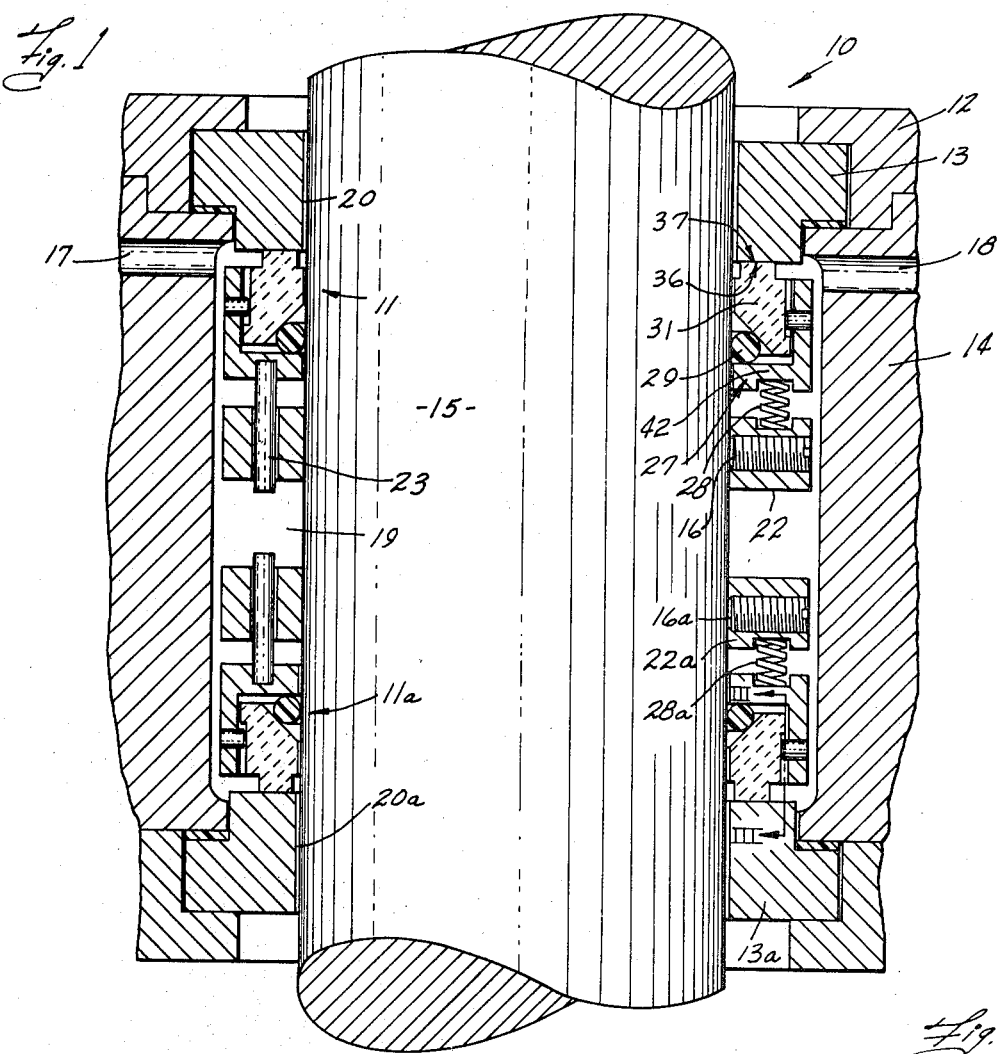
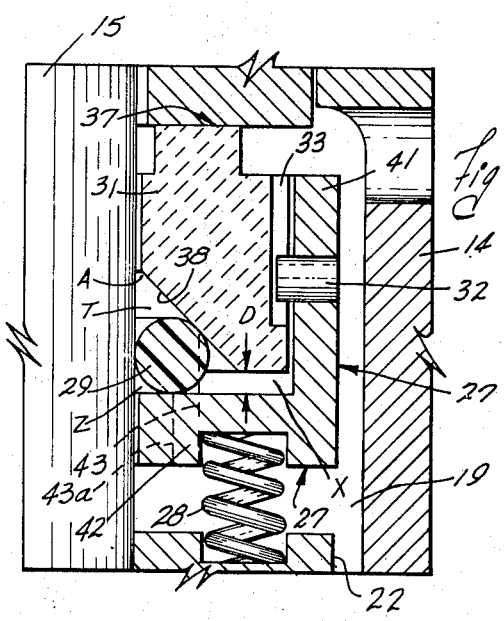
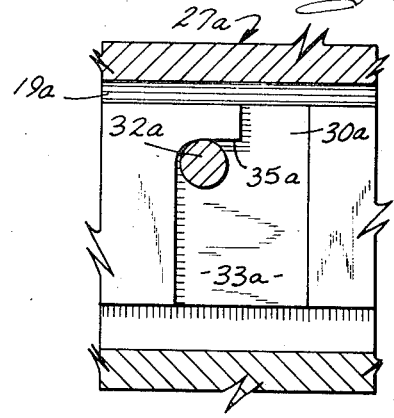
INVENTOR.
HERBERT B. HUMMER
BY
ATTORNEYS United States Patent Office 3,531,131
Patented Sept. 29, 1970

3,531,131
FLUID SEAL FOR ROTATING SHAFTS
Herbert B. Hummer, Schoolcraft Township, Kalamazoo County, Mich., assignor to Durametallic Corporation, Kalamazoo, Mich., a corporation of Michigan
Continuation-in-part of application Ser. No. 510,172, Nov. 29, 1965. This application May 6, 1968, Ser. No. 738,364
Int. Cl. F16j 15/34
U.S. Cl. 277—84     6 Claims

ABSTRACT OF THE DISCLOSURE

A mechanical seal for sealing a shaft with respect to a housing from which it extends, the housing having a fluid chamber therein. The seal includes a rotatable sealing member of a frangible material which is urged into sealing engagement with a nonrotatable sealing member. The rotatable sealing member is provided with a conical opening on the side thereof remote from the sealing face and a resilient O-ring is received within the conical opening. A cup-shaped pressure member surrounds the rotating sealing member and uniformly urges the O-ring against the shaft and the rotating sealing member for creating a sealing engagement therebetween.

CROSS REFERENCE TO RELATED APPLICATIONS

This application is a continuation-in-part of my prior copending application Ser. No. 510,172 filed Nov. 29, 1965 entitled "Mixer Seal," now abandoned.

FIELD OF THE INVENTION

This invention relates to a mechanical seal for sealing a shaft with respect to an enclosure from which it extends, such as a stuffing box of a mixer. More particularly, this invention relates to a seal wherein resilient means are utilized to initially create a seal between a nonrotating sealing surface and a rotating sealing surface and also to compress shaft packing around the shaft forming a seal around the shaft. A sealing fluid under pressure is then introduced into a fluid chamber to increase the pressure under which the two sealing surfaces are urged together and also to further compress the shaft packing around the shaft all for well-known purposes which need no elaboration.

BACKGROUND OF THE INVENTION

Many methods have been employed in the past to effect a sealing around a shaft to prevent leakage of both sealing fluid and operating fluid from an enclosure. Of the many problems involved in providing a seal for a rotary shaft, one of the most important is to provide a high degree of accuracy in making the sealing surfaces. With today's modern machinery, it is relatively simple to get a good, substantially flat, sealing surface. However, it is still difficult, and therefore expensive, to get the planes of both sealing surfaces at the substantially exact degree of perpendicularity with respect to the axis of the shaft. In order to overcome this difficulty in manufacture, it has been customary to provide means whereby the rotating sealing member is held in a floating condition about the shaft so that its sealing surface is free to follow the surface of the nonrotating sealing surface and thus enable a good seal to be created and maintained between the two sealing surfaces.

However, having thus solved one problem, another problem has arisen in that the floating condition between the rotating seal ring and the shaft makes it difficult to create a tight seal between said rotating seal ring and the rotary shaft. Particularly where the shaft packing is soft enough to follow both the shaft and the rotating sealing member adequately as said rotating sealing member floats with respect to said shaft, it is often too soft to withstand high pressures. On the other hand, if the shaft packing is firm enough to withstand high pressures, it will often be too stiff to permit the rotating sealing member to follow the shaft properly. This has been dealt with by urging the shaft packing into place under considerable mechanical pressure and the same is satisfactory where the rotating seal ring is made of metal. However, where, as is sometimes the case, said rotating seal ring is made of a brittle material, such as carbon, and bearing in mind that the stress imposed on the seal ring by tightly packed shaft packing is a tensile stress, said pressure must be held to relatively low limits or it may break the seal ring.

Another problem which has arisen, due to the lack of perpendicularity of the rotating sealing member to the shaft, is the creation of uneven sealing forces between the sealing members. Since one of the sealing members is usually made out of a nonmetallic substance, such as carbon, these uneven sealing forces create severe stress forces within the carbon structure often causing it to break. This problem is especially severe where the carbon member is the rotating sealing member since any pressure which it exerts to press the shaft packing against the shaft reacts into the carbon structure causing stresses as aforesaid.

While various seal assemblies have been constructed which have attempted to utilize a rotating seal ring made from a brittle material, such as carbon, most of these seal assemblies have been utilized only in low pressure systems wherein the rotating seal ring can be driven by means of a friction drive device which needs to supply only a small amount of torque for driving the brittle carbon ring. However, when the seal assembly is to be utilized on a high pressure system wherein the brittle rotating seal ring is subjected to the high pressure fluid, an entirely different problem is presented due to the fact that the high pressure fluid exerts a large force on the rotating seal ring such that it is impractical to frictionally drive same. Consequently, it becomes necessary to provide a positive mechanical drive means for rotating the brittle seal ring synchronously with the shaft. However, such positive mechanical drive means impose relatively large forces and stresses on the brittle rotating seal ring, which stresses create strains on the brittle ring which often cause breakage or cracking thereof. Thus, these prior high pressure seal assemblies have not successfully solved the problem of how to utilize a rotating seal ring constructed of a brittle material, such as carbon, while at the same time provide an adequate seal between the rotating seal ring and the shaft.

A still further problem arises out of the handling of the seal ring prior to the time of installation into the stuffing box of a mixer or other equipment with which same is to be used. When the carbon element is a nonrotating sealing member, same is normally press fitted into a steel gland, or equivalent structure, and is well protected. However, when a rotating sealing member is made from carbon, it normally has no encasing means and, being brittle, it has relatively low resistance to shock and resultant breakage during shipment or other handling prior to actual installation.

Accordingly, the objects of this invention include:

(1) To provide a means for mechanically sealing a rotary shaft with respect to a wall through which it extends, which means is particularly applicable to a seal wherein the rotating member is made of carbon or other relatively brittle material.

(2) To provide a mechanical seal as aforesaid wherein the rotating sealing member is somewhat floatable with respect to the shaft upon which it is mounted and with which it rotates but sealing means are provided between said rotating sealing member and said shaft, which means are capable of resisting the high pressure without detracting from the desired floatability of said rotating sealing member.

(3) To provide a rotary mechanical sealing device as aforesaid wherein the rotating sealing member is provided with recess means at the side opposite the sealing face thereof, said recess means receiving an O-ring of flexible material therein and wherein said O-ring is urged into sealing condition by a single pressure unit which simultaneously exerts a substantially uniform pressure throughout the circumference of said O-ring and provides mechanical protection around the rotating sealing member to protect it, particularly during handling prior to installation, from accidental shock and resulting damage.

(4) To provide a rotary mechanical sealing device as aforesaid wherein said recess means may be in either the rotating sealing member or in the portion of the pressure unit facing the rotating sealing member, or both.

(5) To provide further a shaft seal as aforesaid particularly applicable to a structure having a nonmetallic, brittle rotating seal member in which the forces acting radially outwardly on the rotating sealing member are so controlled that they will not excessively stress said sealing member.

(6) To provide a sealing device as aforesaid wherein positive mechanical drive means are provided for positively rotating the nonmetallic brittle seal member with the mechanical drive means being capable of applying a relative large torque to said brittle nonmetallic seal member without causing cracking or breakage thereof.

(7) To provide a sealing device as aforesaid wherein the positive mechanical drive means for the nonmetallic rotating seal member comprises a pressure member having a flange positioned adjacent to and surrounding the periphery of the rotating seal member with the flange having pins fixedly secured thereto and extending radially inwardly so as to be received within shallow grooves formed on the periphery of the brittle rotating seal member.

(8) To provide a sealing device as aforesaid wherein the radial drive pins preferably contact the grooves formed in the periphery of the brittle rotating seal member at a location corresponding substantially to the thickest portion of the seal member.

(9) To provide a sealing device as aforesaid wherein the radial drive pins contact the grooves formed in the periphery of the rotating seal member at a location between the sealing face formed thereon and the point of contact of the O-ring with the rotating seal member.

(10) To further provide a means for sealing a rotary shaft with respect to a wall through which it extends, which seal is not sensitive to moderate out-of-round conditions of the shaft.

(11) To further provide a seal which prevents the escape of fluid from a fluid chamber as well as prevents the lubricant from running along the shaft through the stuffing box into the container of a mixer.

(12) To provide a rotary mechanical seal as aforesaid which is particularly adapted for installation and use on a vertically positioned shaft.

Other objects and purposes will become apparent to persons acquainted with devices of this general type upon reading the following specification and inspecting the accompanying drawings.

BRIEF DESCRIPTION OF THE DRAWINGS

FIG. 1 is a central longitudinal sectional view taken through a mechanical seal constructed according to the invention and shown in association with a shaft and a housing.

FIG. 2 is a blown-up view of one-half of one set of the sealing arrangements shown in FIG. 1.

FIG. 3 is a sectional view taken on line III—III in FIG. 1.

In the following description certain terminology will be used for convenience in reference but it will be understood that such terminology is employed solely for convenience in description and has no limiting effect. The terms "inside" and "outside" and derivatives thereof will refer to directions axially of said shaft toward and away from the interior of the equipment with which said shaft is used. The terms "radially inwardly" and "radially outwardly" will refer to radial directions toward and away from the axis of the shaft. The terms "upwardly" and "downwardly" will have reference to the pictorial representation shown in FIG. 1.

GENERAL DESCRIPTION

The objects and purposes of this invention, including those set forth above, have been met by providing a device in which the seal has a chamber for a sealing fluid and when said chamber is pressurized by the sealing fluid the sealing surfaces of the rotating sealing members are urged into firm contact with the sealing surfaces of the nonrotating sealing members while at the same time each rotating sealing member compresses shaft packing firmly around the shaft. A conical opening is, in the preferred embodiment, provided on the side of said rotating sealing member remote from the sealing face thereof and an O-ring of firm, yet resilient material, such as one of the tetrafluoroethylene products, is received as a shaft packing. Said O-ring is of sufficient size to project slightly rearwardly of the rearward surface of said rotary seal ring whereby the base of a cup-shaped pressure member bears thereagainst with the flange of said pressure member surrounding the rotary seal ring. The flange of said pressure member simultaneously protects the seal ring from damage while holding the pressure member in a position to apply uniform pressure to said O-ring.

The rotating sealing member is made of a brittle and frangible material, such as carbon, and is positively driven by means of the pressure member. The rotating sealing member is provided with shallow grooves formed on the periphery thereof in substantially the thickness portion of the sealing member, which grooves are engaged by radial drive pins fixedly secured to the flange of the pressure member.

DETAILED DESCRIPTION

Since the sealing means 10 in FIG. 1 shows two identical but oppositely disposed upper and lower sealing means 11 and 11a, respectively, the upper sealing unit 11 will be described as representative of both thereof, for the sake of simplicity only and is intended to have no limiting effect. The lower sealing member 11a is, in this embodiment, identical with the upper sealing member 11 and corresponding parts will be designated by corresponding numbers with the suffix a added. It will be understood, however, that in the particular embodiment shown, the upper and lower sealing unit are made identical solely for the purpose of convenience and the easy provision of service parts, and that in practice said units may be different if desired. In the particular embodiment shown, the sealing unit 10 is provided around the vertically positioned shaft of a mixer or an autoclave wherein, for structural reasons, it is desired that the nonrotating sealing member be of steel. This, in turn, requires that the rotating sealing member be of softer material, usually carbon. Thus, the necessity for a carbon rotating sealing member will manifest itself only in connection with the upper sealing device 11, but the illustrated embodiment is shown as utilizing the same construction for both sealing units inasmuch as same is commonly used in the usual embodiments of the invention.

The sealing unit 11 (FIG. 1) is positioned within a mounting plate 12 and a nonrotating sealing member 13, having a sealing surface 36, is affixed to the mounting plate 12. A cylindrical member 14 is concentrically positioned around the shaft 15 between the two nonrotating sealing members 13 and 13a to define a fluid chamber 19. Said member 14 has through its wall two holes 17 and 18 to provide for the ingress and egress of highly pressurized sealing fluid. The shaft 15 extends outwardly from the fluid chamber 19 through the openings 20 and 20a in the nonrotating sealing members 13 and 13a, respectively.

A collar 22 is releasably clamped to the shaft 15 by a setscrew 16 so as to prevent axial movement of the collar 22 with respect to the shaft 15. A cup-shaped shroud or pressure member 27 is slideably connected by a plurality of drive pins 23 rigidly held by shroud 27, to the collar 22 having a plurality of holes 24 which receive the drive pins 23. Springs 28 are positioned between the collar 22 and the pressure member 27, the ends of the springs being seated within recesses formed in the respective collar and pressure member whereby the springs urge the pressure member 27 upwardly.

The shroud or pressure member 27 encircles a nonmetallic rotating sealing membe 31 in a closely fitting but loose manner allowing it to move freely axially with respect to the shroud member 27 and permitting its sealing surface 37 to move angularly to follow variations from exact perpendicularity of the surface 36. Radial drive pins 32 are rigidly attached to the flange portion 41 of the cup-shaped shroud member for driving the rotating sealing member 31 in the area 34 between the base 42 and the shaft 15. Shallow axial grooves 33 in the rotating sealing member 31 are provided to slideably receive the pins 32 and thus prevent relative rotation of the shroud 27 and the rotating sealing member 31.

FIG. 3 is a view showing the shape of a groove 33a. The shape of the groove 33a is identical to that of the groove 33 and is designed so that the rotating sealing member 31a in the sealing unit 11a will not fall out of the shroud 27a during assembly. The milled-out portion 35a forms a shoulder or stop to prevent a properly aligned pin 32a from sliding freely through the opening 30a in the groove 33a.

The rotating sealing member 31 is constructed in such a manner that it has an annular sealing surface 37 and an annular beveled surface 38 at the axially opposite end thereof. A packing means 29 is disposed between the shroud 27 and the sealing member 31 in the triangular recess T defined by the surface of the shaft 15, the surface of the bevel 38, and the inner surface of the bottom or ring portion 42 of the shroud 27. Said packing means 29 is preferably an O-ring having a substantially circular cross section in the nondeformed condition and being made from a resilient but stiff material. A preferred material, but not the only material conceivable, is one of the tetrafluorethylene products. Said O-ring is of sufficient size that is protrudes downwardly, that is, in a direction away from the face 38 of the rotating sealing member, a distance D sufficient that the base portion 42 of the pressure member 27 will bear against it and will push it toward the apex A of the above-mentioned triangular zone T before said portion 42 contacts the lower end of the rotary seal 31. It will be apparent that the upward pressure of said shroud 27 will cause the O-ring 29 to bear against both the surface 38 of the seal ring 31 and the surface of the shaft 15 in a manner effective to prevent the passage of liquid therebetween.

All of the forces exerted on the packing ring 29 being perpendicular to the surface against which said ring bears, the angular relationship of the bevel 38 to the shaft 15 is important. It has been found that if the bevel 38 is at an angle of approximately 45 degrees to the axis of the shaft, it will generate sufficient radially outward forces against said seal ring 31 to effect a sealing relationship therewith. At the same time it will press against the shaft tightly enough to limit the sealing fluid which, in a normal manner, passes between the base 42 and the shaft to reach zone Z where it acts against the lower left side of the O-ring to urge it upwardly against surface 38. Other pressure fluid from chamber 19 passes around the flange 41 into the zone X where it acts against the lower end 46 of the rotating sealing member 31 to urge same upwardly against the nonrotating sealing member 13 to maintain the sealing pressure therebetween and also acts on the lower rightward side of the O-ring between the lines 43 and 43a to urge same upwardly against the surface 38. This and the pressure in zone Z urges the O-ring 29 firmly against the seal ring 31 at the contact zone C for effecting a tight seal therebetween and does so near the center of its annular dimension to minimize distortion thereof. Thus, the force of the springs 28 provides an initial pressure to urge O-ring 29 into place when no liquid pressure is applied but under normal high pressure operating conditions the liquid pressure acting directly against the O-ring provides the primary force urging it against the surface 38.

It should be noted further that the flange 41 of the shroud 27 will guide the base 42 with respect to the rotating sealing member 31 and cause same to follow the movement thereof. Thus, the base 42 will bear uniformly at all times against O-rings 29 and will be free from the high and low values therein which are caused when said rotating sealing member 31 floats and the base 42 does not.

A beveled surface can also be placed on the radially inward portion of the base 42 diverging in the direction of the O-ring to locate the recess T therein, instead of, or in addition to, having the beveled surface 38 on the sealing member 31. If the sealing member 31 has a substantially flat lower surface bearing against the O-ring, it can be more resistant to high stresses building up within same because the stresses would be solely or at least primarily, compressive.

While the packing ring 29 has been referred to above as preferably of tetrafluoroethylene material, it will be recognized that this is a matter of preference only and that the use of other packing rings will be acceptable if they have sufficient rigidity to withstand the pressure imposed thereon while having also sufficient flexibility or elasticity to follow the floating of the rotating sealing member and effecting a snug seal with respect thereto, all within the contemplation of the invention.

It is also recognized that, while it is preferred to slope the surface 38 at an angle of approximately 45 degrees to the axis of the shaft 15, the precise angle is a function in part of the strength of the material from which the rotating sealing member 31 is made and in part a function of the rigidity of the packing ring 29 under the pressure to which it is subjected. Thus, where very high pressures are involved, such as to require a tight wedging of the ring 29 into the space T, within the limits permitted by the strength of the material from which the sealing ring 31 is made, the slope of surface 38 may be lower. On the other hand, where the material from which the sealing ring 31 is made is excessively weak, then the slope of the surface 38 should be made as high as possible, within the limits imposed by the necessity for effecting a liquid-proof seal between said packing ring 29, the shaft 15 and surface 38 or else it may cause the sealing member to break before an adequate seal is formed at the sealing surfaces. This is because the nonmetallic sealing member, even though it can withstand high compressive forces, cannot usually withstand high tensile forces. With an angle of 15 degrees, for example, the force acting perpendicular on the beveled surface 38 would be substantially radial thus creating high tensile forces which might cause the sealing member 31 to break. However, it has been found that higher angles, such as of 45 degrees or greater, substantially reduce the high radial forces on the nonmetallic sealing member 31 and thereby substantially increase the sealing force which it can withstand.

A still further problem encountered designing a successful high pressure seal assembly using a rotating brittle seal ring is a consideration of the stresses imposed on the seal ring due to same being surrounded by highly pressurized fluid. The highly pressurized fluid contained within the chamber acts on the nonmetallic sealing ring 31 and on the packing ring 29 whereupon the rotating sealing ring 31 is urged into tight sliding engagement with the stationary sealing ring 13. Thus, a relatively large clamping force exists between the sealing surfaces 36 and 37 whereupon a substantially large torque must be applied to the rotating seal ring 31 in order to cause same to positively rotate with the shaft 15. Development of the necessary torque to rotatably drive the sealing ring 31 thus requires that the sealing ring be positively mechanically driven and, as explained above, the rotating sealing ring 31 is positively mechanically driven by means of the radial drive pins 32 secured to the flange 41 of the pressure member 27, which drive pins are received within shallow grooves 33 formed in the periphery of the rotating seal member 31. Further, the relationship between the drive pins 32 and the grooves 33 is critical since the rotating sealing ring 31 is made of a brittle material which is easily cracked or broken when subjected to substantially large forces or stresses. Thus, in the seal assembly illustrated in FIG. 1, it is important that the drive pins 32 be fixedly secured on the metallic pressure member 27 since the pins can easily be secured thereto without causing any damage to the pressure member. On the other hand, any attempt to fixedly secure the pins 32 to the brittle nonmetallic sealing member 31 would most likely result in the development of undesirable strains within the pressure member and accordingly result in cracking or breakage thereof.

Not only should the drive pins 32 be fixely secured to the pressure member 27, but also the point of contact between the pins 32 and the shallow grooves 33 should also be carefully selected in relationship to the configuration of the pressure member 31 so as to prevent the application of large forces to the pressure member at a location which would result in cracking or breakage thereof. For example, the drive pin 32 preferably contacts the groove 33 at a location substantially in the thickest portion of the sealing ring 31. This relationship is illustrated in FIG. 2 wherein the axial centerline of the pin 32 substantially is aligned with the apex A of the recess formed in the seal ring 31 such that the drive pin 32 thus contacts the seal ring 31 substantially at its radially thickest portion.

Further, as illustrated in FIG. 2, the groove 33 is shallow relative to the overall radial thickness of the sealing ring 31 so as not to substantially reduce the strength thereof. Also, the groove is formed with the shoulder 35a thereon so as to prevent the drive pin 32 from drivingly engaging the sealing ring 31 adjacent the face 46 thereof since this end of the sealing ring 31 is of substantially reduced thickness due to the presence of the conical recess formed therein. Accordingly, the application of any large force to the seal ring 31 adjacent the face 46 would impose undesirable stresses and strains on the sealing ring and most likely result in damage thereto.

It has been discovered that the brittle rotating sealing ring 31 can be safely positively driven by the drive pins 32 if same contacts the sealing ring 31 at an axial location between the sealing surface 37 and the zone of contact C. Since the packing ring 29 exerts a substantially large outward support force on the conical surface 38 at the point of contact C, this support force strengthens and substantially rigidly supports the tapered extremity of the seal ring 31 and thus permits the drive pins 32 to contact the seal ring 31 at a location substantially radially adjacent the point of contact C without the drive pins causing any substantial damage to the sealing ring 31. Thus, the shoulder 35a formed on the end of the shallow groove is thus substantially aligned with the point of contact C as illustrated in FIG. 2 so as to insure that the drive pins 32 will drivingly contact the sealing ring 31 at an axial location at or beyond the contact point C.

OPERATION

Since both the upper and lower sealing units 11 and 11a operate in an identical manner, only the upper sealing unit will be summarized. This is for the sake of simplicity only and is not intended to have a limiting effect.

The initial force causing a seal to be produced is provided by the springs 28 firmly held between the axially stationary collar 22 and the shroud 27 by drive pins 23. The springs 28 urge the shroud member 27 axially upwardly against the packing means 29. The packing means 29 is in turn urged against the beveled surface 38 of the sealing member 31 which causes the packing means to also be urged against the surface of the shaft 15. The sealing member 31 is urged axially upwardly by the force acting on the packing means 29 and the hydraulic force acting on the sealing member itself so that its sealing surface 37 is in contact with the sealing surface 36 of the nonrotating sealing member 13. Since the sealing surface 37 is free to take the same angular position with respect to the shaft 15 as is the sealing surface 36, a tight seal is created. The packing means 29 is flexible enough to absorb the same angular relationship as is the sealing member 31 and still remain in contact with the surface of the shaft 15 and the beveled surface 38 of the sealing member 31.

A highly pressurized sealing fluid is then introduced in a conventional manner into the fluid chamber 19 and assures effective backing of the seal.

The placement of the shaft packing 29 into an angularly formed recess, urges it more directly toward the shaft and hence builds a better sealing pressure thereon, and without excessive outward pressure on the rotating sealing member, than when the shaft packing was merely placed into a rectangular recess as in the previous practice. This makes possible the use of a commercially available O-ring for shaft packing with resulting cost savings and better convenience over previous practice than with the special shaft packings previously used.

While a particular preferred embodiment of the invention has been disclosed in detail hereinabove, it will be recognized that the invention includes such variations thereof as lie within the scope of the invention as defined in the appended claims.

The embodiments of the invention in which an exclusive property or privilege is claimed are defined as follows:

1. In combination with a rotary shaft and a housing means from which the shaft extends, said housing means having a fluid chamber therein and a high pressure fluid in communication with said chamber, said rotary shaft being positioned within and extending through said fluid chamber, and a seal assembly disposed within the chamber for sealing the shaft with respect to the housing means, the improvement wherein said seal assembly comprises:

a nonrotatable sealing member affixed to said housing means and having an opening therein and a first sealing surface on the inner side thereof, said rotary shaft extending through said opening;

a rotatable sealing member encircling said rotary shaft and disposed within said fluid chamber and having a second sealing surface maintained in rotatable sliding contact with said first sealing surface, said rotatable sealing member being floatable relative to said shaft to assume the same degree of incline with respect to the axis of said shaft as said first sealing surface, said rotatable sealing member being constructed of brittle carbon material;

a cup-shaped pressure member disposed within said fluid chamber and having a flange portion encircling and lying closely adjacent the peripheral surface of said rotatable sealing member, said pressure member further having a base portion facing axially spaced from said rotatable sealing member;

a collar member disposed within said chamber and releasably clamped to said rotary shaft, and a plurality of drive pins drivingly connecting said collar member and said pressure member for rotating said pressure member with said rotary shaft;

drive means interconnecting said pressure member to said rotatable sealing member for positively rotating said rotatable sealing member whenever said pressure member is rotated by said shaft, said drive means including at least one radial pin fixedly secured to the flange portion of said pressure member and extending radially inwardly toward said rotatable sealing member, said drive means further including a shallow axially elongated groove formed in the periphery of said rotatable sealing member with said radial pin being slideably received within said groove for permitting relative axial movement between said pressure member and said rotatable sealing member, said radial pin drivingly engaging said groove approximately in the radially thickest portion of the rotatable sealing member;

an O-ring member of stiff, resilient, tetrafluoroethylene material positioned between and in contact with the base portion of said pressure member and said rotatable sealing member, the cross section of said O-ring member being substantially circular when in the nondeformed condition;

said rotatable sealing member having a coaxial conical recess therein for the reception of said O-ring member, said conical recess extending from the face of the rotatable sealing member remote from said second sealing surface and defining a conical surface, said recess diverging in a direction toward the base portion of said pressure member and having a slope of approximately 45 degrees relative to the axis of said rotary shaft; and resilient means positioned between said collar member and said pressure member urging said pressure member axially toward said rotatable sealing member for compressing said O-ring member simultaneously against the conical surface in said rotatable sealing member and against the periphery of said rotary shaft, the cross-sectional diameter of said O-ring member being sufficient so that the base portion of said pressure member is normally spaced a small axial distance from the adjacent face of said rotatable sealing member when said O-ring member is compressed against said conical surface;

said high pressure fluid within the fluid chamber contacting a portion of said O-ring member and applying a pressure force thereto in a direction causing said O-ring member to be compressed against the shaft and against the conical surface of said rotatable sealing member, said O-ring member contacting the conical surface at a point which is substantially axially spaced from said second sealing surface, and said radial pin rotatably drivingly engaging said groove at an axial location between said above-mentioned point of contact and said second sealing surface;

whereby the tendency of said pressure member to follow said rotatable sealing member in any angular movement of said rotatable sealing member with respect to said shaft will cause said pressure member to maintain a substantially uniform pressure on said O-ring as said rotatable sealing member responds to any lack of perpendicularity between the first sealing surface formed on said nonrotatable sealing member and the axis of said shaft.

2. A seal assembly mechanically sealing a rotary shaft with respect to a housing means from which it extends, said housing means having a fluid chamber adapted to receive a high pressure fluid therein with said rotary shaft being positioned within said fluid chamber, said seal assembly comprising:

a nonrotatable sealing member affixable to said housing means and having an opening therein and a first sealing surface on the inner side thereof, said rotary shaft being positioned within said housing means and extending through said opening;

a rotatable sealing member encircling said rotary shaft within said fluid chamber and having a second sealing surface maintained in rotatable sliding contact with said first sealing surface, said rotatable sealing member being floatable relative to said shaft to assume the same degree of incline with respect to the axis of said shaft as said first sealing surface, said rotatable sealing member being of a nonmetallic brittle material;

a cup-shaped pressure member within said fluid chamber having a flange portion encircling and lying closely adjacent the peripheral surface of said rotatable sealing member, said pressure member further having a base portion facing and axially spaced from said rotatable sealing member;

a collar member releasably clamped to said rotary shaft and a plurality of drive pins drivingly connecting said collar member and said pressure member for rotating said pressure member with said rotary shaft;

drive means interconnecting said pressure member to said rotatable sealing member for positively rotating said rotatable sealing member whenever said pressure member is rotated by said shaft, said drive means including at least one radial pin fixedly secured to the flange portion of said pressure member and extending radially inwardly toward said rotatable sealing member, said drive means further including a shallow axially elongated groove formed in the periphery of said rotatable sealing member with said radial pin being slideably received within said groove for permitting relative axial movement between said pressure member and said rotatable sealing member, and said groove having shoulder means for limiting relative axial movement between said rotatable sealing member and said pressure member to prevent axial separation thereof when said radial pin is axially aligned with said shoulder means;

an O-ring member of stiff, resilient material positioned between and in contact with the base portion of said pressure member and said rotatable sealing member, the cross section of said O-ring member being substantially circular when in the nondeformed condition;

said rotatable sealing member having a coaxial conical recess therein for the reception of said O-ring member, said conical recess extending from the face of the rotatable sealing member remote from said second sealing surface and defining a conical surface, and said recess diverging in a direction toward the base portion of said pressure member; and resilient means positioned between said collar member and said pressure member urging said pressure member toward said rotatable sealing member for compressing said O-ring member simultaneously against the conical surface in said rotatable sealing member and against the periphery of said rotary shaft, the cross-sectional diameter of said O-ring member being sufficient so that the base portion of said pressure member is normally spaced a small distance from the adjacent face of said rotatable sealing member when said O-ring member is compressed against said conical surface;

said O-ring member being compressed into contact with the conical surface of said rotatable sealing ring at a point which is substantially axially spaced from said second sealing surface, and said radial pin rotatably drivingly engaging said groove at an axial location between said above-mentioned point of contact and said second sealing surface;

whereby the tendency of said pressure member to follow said rotatable sealing member in any angular movement of said rotatable sealing member with respect to said shaft will cause said pressure member to maintain a substantially uniform pressure on said O-ring as said rotatable sealing member responds to any lack of perpendicularity between the first sealing surface formed on said nonrotatable sealing member and the axis of said shaft.

3. A seal assembly as defined in claim 2 wherein said radial pin drivingly engages said groove approximately in the radially thickest portion of the rotatable sealing member.

4. A seal assembly as defined in claim 2, wherein the rotatable sealing member is made of carbon.

5. A seal assembly as defined in claim 2, wherein said conical recess has a slope of approximately 45 degrees relative to the axis of said rotary shaft, and wherein said O-ring member is of a tetrafluoroethylene material.

6. A seal assembly as defined in claim 2, wherein the fluid chamber contains a highly pressurized fluid therein, said fluid contacting a portion of said O-ring member and applying a pressure force thereto in a direction causing said O-ring member to be compressed against the shaft and the conical surface of said rotatable sealing member.

References Cited

UNITED STATES PATENTS

| | | | |
|---|---|---|---|
| 2,112,461 | 3/1938 | Kohler | 277—87 X |
| 2,362,436 | 11/1944 | Stratford | 277—87 |
| 2,760,794 | 8/1956 | Hartranft | 277—87 |
| 2,877,029 | 3/1959 | Peguet et al. | 277—84 X |

OTHER REFERENCES

Machine Design, September 1944, p. 128.

FRED C. MATTERN, Jr., Primary Examiner

J. S. MEDNICK, Assistant Examiner

U.S. Cl. X.R.

277—87, 136